United States Patent
Miller et al.

(10) Patent No.: US 7,106,329 B1
(45) Date of Patent: Sep. 12, 2006

(54) METHODS AND APPARATUS FOR DISPLAYING DISPARATE TYPES OF INFORMATION USING AN INTERACTIVE SURFACE MAP

(75) Inventors: Nancy E. Miller, San Diego, CA (US); Jeffrey D. Saffer, Richland, WA (US); Randall E. Scarberry, Richland, WA (US); Scott D. Decker, Richland, WA (US); Sean J. Zabriskie, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/408,716

(22) Filed: Sep. 30, 1999

(51) Int. Cl.
G06T 11/20 (2006.01)

(52) U.S. Cl. .................................... 345/440

(58) Field of Classification Search ............... 345/440, 345/441, 581; 702/20; 707/2–7; 715/764; 382/128, 133, 167, 225
See application file for complete search history.

(56) References Cited

U.S. PATENT DOCUMENTS

| | | | |
|---|---|---|---|
| 5,047,842 A | 9/1991 | Bouman, Jr. et al. | 358/515 |
| 5,121,337 A | 6/1992 | Brown | 702/28 |
| 5,261,093 A | 11/1993 | Asmuth | 707/2 |
| 5,272,769 A * | 12/1993 | Strnatka et al. | 345/804 |
| 5,325,298 A | 6/1994 | Gallant | 704/9 |
| 5,361,326 A | 11/1994 | Aparicio, IV et al. | 706/44 |
| 5,446,681 A | 8/1995 | Gethner et al. | 702/27 |
| 5,461,708 A * | 10/1995 | Kahn | 345/440 |
| 5,506,937 A | 4/1996 | Ford et al. | 706/11 |
| 5,528,735 A | 6/1996 | Strasnick et al. | 345/427 |
| 5,546,472 A | 8/1996 | Levin | 382/131 |
| 5,555,354 A | 9/1996 | Strasnick et al. | 345/437 |
| 5,574,837 A * | 11/1996 | Clark et al. | 345/440 |
| 5,592,599 A * | 1/1997 | Lindholm | 345/427 |
| 5,619,709 A * | 4/1997 | Caid et al. | 707/532 |
| 5,623,679 A | 4/1997 | Rivette et al. | 707/526 |
| 5,623,681 A | 4/1997 | Rivette et al. | 707/522 |
| 5,625,767 A | 4/1997 | Bartell et al. | 345/440 |
| 5,659,766 A | 8/1997 | Saund et al. | 704/9 |
| 5,671,381 A | 9/1997 | Strasnick et al. | 345/848 |
| 5,675,788 A | 10/1997 | Husick et al. | 707/104.1 |
| 5,687,364 A | 11/1997 | Saund et al. | 704/5 |
| 5,692,107 A | 11/1997 | Simoudis et al. | 706/12 |
| 5,696,963 A | 12/1997 | Ahn | 707/5 |
| 5,699,507 A | 12/1997 | Goodnow, II et al. | 395/183.14 |
| 5,721,903 A | 2/1998 | Anand et al. | 707/102 |
| 5,721,912 A | 2/1998 | Stepczyk et al. | 707/102 |

(Continued)

FOREIGN PATENT DOCUMENTS

EP 0 202 686 A2 11/1986

(Continued)

OTHER PUBLICATIONS

U.S. Appl. No. 09/409,260—Jeffrey Saffer et al.—filed Sep. 30, 1999.

(Continued)

*Primary Examiner*—Matthew C. Bella
*Assistant Examiner*—Anthony J. Blackman
(74) *Attorney, Agent, or Firm*—Finnegan, Henderson, Farabow, Garrett & Dunner, LLP; Konstantin Linnik, Esq.

(57) ABSTRACT

Methods and apparatus allow a user to explore the information contained in sets of records and their associated attributes through the use of interactive surface maps. The records may contain various types of attributes, including text, numeric, categoric, and sequence data.

14 Claims, 7 Drawing Sheets

U.S. PATENT DOCUMENTS

| | | | | |
|---|---|---|---|---|
| 5,732,260 | A | | 3/1998 | Nomiyama .................... 707/5 |
| 5,737,591 | A | | 4/1998 | Kaplan et al. ................. 707/1 |
| 5,751,612 | A | | 5/1998 | Donovan et al. ............. 703/6 |
| 5,767,854 | A | | 6/1998 | Anwar ........................ 345/848 |
| 5,784,544 | A | | 7/1998 | Stevens ..................... 358/1.13 |
| 5,787,274 | A | | 7/1998 | Agrawal et al. ............ 707/102 |
| 5,794,178 | A | * | 8/1998 | Caid et al. ................... 345/440 |
| 5,819,258 | A | | 10/1998 | Vaithyanathan et al. ....... 707/2 |
| 5,838,973 | A | | 11/1998 | Carpenter-Smith et al. . 717/105 |
| 5,842,206 | A | | 11/1998 | Sotomayor .................... 707/5 |
| 5,857,179 | A | | 1/1999 | Vaithyanathan et al. ....... 707/2 |
| 5,857,185 | A | | 1/1999 | Yamaura ....................... 707/5 |
| 5,861,891 | A | | 1/1999 | Becker ....................... 345/619 |
| 5,864,863 | A | | 1/1999 | Burrows ..................... 707/103 |
| 5,873,076 | A | | 2/1999 | Barr et al. ..................... 707/3 |
| 5,907,838 | A | | 5/1999 | Miyasaka et al. ............. 707/4 |
| 5,913,214 | A | | 6/1999 | Madnick et al. ............. 707/10 |
| 5,918,010 | A | | 6/1999 | Appleman et al. ......... 709/203 |
| 5,926,806 | A | | 7/1999 | Marshall et al. ............... 707/3 |
| 5,926,820 | A | | 7/1999 | Agrawal et al. ........... 707/200 |
| 5,930,784 | A | | 7/1999 | Hendrickson .................. 707/2 |
| 5,930,803 | A | | 7/1999 | Becker et al. ............. 707/104 |
| 5,945,982 | A | | 8/1999 | Higashio et al. .............. 707/3 |
| 5,953,006 | A | | 9/1999 | Baker et al. ................ 345/326 |
| 5,953,716 | A | | 9/1999 | Madnick et al. ............... 707/4 |
| 5,963,965 | A | | 10/1999 | Vogel ........................ 707/501 |
| 5,966,139 | A | | 10/1999 | Anupam et al. ............ 345/440 |
| 5,982,370 | A | | 11/1999 | Kamper ..................... 345/760 |
| 5,986,652 | A | | 11/1999 | Medl et al. ................. 345/712 |
| 5,986,673 | A | * | 11/1999 | Martz ......................... 345/440 |
| 5,987,470 | A | | 11/1999 | Meyers et al. ............. 707/102 |
| 5,991,714 | A | | 11/1999 | Shaner .......................... 704/9 |
| 5,999,192 | A | | 12/1999 | Selfridge et al. ........... 345/440 |
| 5,999,937 | A | | 12/1999 | Ellard ........................ 707/101 |
| 6,012,053 | A | | 1/2000 | Pant et al. ..................... 707/3 |
| 6,014,661 | A | | 1/2000 | Ahlberg et al. ................ 707/3 |
| 6,023,694 | A | | 2/2000 | Kouchi et al. ................. 707/2 |
| 6,026,409 | A | | 2/2000 | Blumenthal ................ 707/104 |
| 6,029,176 | A | | 2/2000 | Cannon ...................... 707/104 |
| 6,032,157 | A | | 2/2000 | Tamano et al. ............. 707/104 |
| 6,034,697 | A | | 3/2000 | Becker ....................... 345/606 |
| 6,035,057 | A | * | 3/2000 | Hoffman ..................... 382/159 |
| 6,038,538 | A | | 3/2000 | Agrawal et al. ................ 705/7 |
| 6,038,561 | A | | 3/2000 | Snyder et al. ................. 707/6 |
| 6,044,366 | A | | 3/2000 | Graffe et al. ................... 707/2 |
| 6,049,806 | A | | 4/2000 | Crecine ...................... 707/200 |
| 6,058,391 | A | | 5/2000 | Gardner ........................ 707/4 |
| 6,067,542 | A | | 5/2000 | Carino, Jr. ..................... 707/4 |
| 6,073,115 | A | | 6/2000 | Marshall ...................... 705/35 |
| 6,073,138 | A | | 6/2000 | de l'Etraz et al. .......... 707/104 |
| 6,078,314 | A | | 6/2000 | Ahn ............................ 345/169 |
| 6,078,914 | A | | 6/2000 | Redfern ......................... 707/3 |
| 6,081,788 | A | | 6/2000 | Appleman et al. ............ 705/14 |
| 6,081,802 | A | | 6/2000 | Atherton et al. ............... 707/3 |
| 6,085,190 | A | | 7/2000 | Sakata .......................... 707/6 |
| 6,088,032 | A | | 7/2000 | Mackinlay .................. 345/848 |
| 6,092,061 | A | | 7/2000 | Choy ............................ 707/1 |
| 6,094,648 | A | | 7/2000 | Aalbersberg ................... 707/3 |
| 6,094,649 | A | | 7/2000 | Bowen et al. ................. 707/3 |
| 6,098,065 | A | | 8/2000 | Skillen et al. ................. 707/3 |
| 6,100,901 | A | | 8/2000 | Mohda et al. .............. 345/440 |
| 6,101,493 | A | | 8/2000 | Marshall et al. ............... 707/3 |
| 6,108,004 | A | | 8/2000 | Medl .......................... 345/804 |
| 6,108,651 | A | | 8/2000 | Guha ............................ 707/4 |
| 6,108,666 | A | | 8/2000 | Floratos et al. ............ 707/104 |
| 6,111,578 | A | | 8/2000 | Tesler ........................ 345/850 |
| 6,112,194 | A | | 8/2000 | Bigus .......................... 706/11 |
| 6,112,209 | A | | 8/2000 | Gusack ....................... 707/101 |
| 6,121,969 | A | * | 9/2000 | Jain et al. ................... 345/850 |
| 6,122,636 | A | | 9/2000 | Malloy et al. ............. 707/102 |
| 6,128,624 | A | | 10/2000 | Papierniak et al. ......... 707/104 |
| 6,188,403 | B1 | * | 2/2001 | Sacerdoti et al. ........... 715/764 |
| 6,222,540 | B1 | * | 4/2001 | Sacerdoti .................... 345/581 |
| 6,252,597 | B1 | * | 6/2001 | Lokuge ...................... 345/841 |
| 6,259,451 | B1 | * | 7/2001 | Tesler ......................... 345/419 |
| 6,289,353 | B1 | * | 9/2001 | Hazlehurst et al. ......... 707/102 |
| 6,327,574 | B1 | * | 12/2001 | Kramer et al. ................ 705/14 |
| 6,374,251 | B1 | | 4/2002 | Fayyad et al. .............. 707/101 |
| 6,463,431 | B1 | * | 10/2002 | Schmitt .......................... 707/5 |
| 6,493,709 | B1 | | 12/2002 | Aiken ........................... 707/4 |
| 6,707,454 | B1 | * | 3/2004 | Barg et al. .................. 345/440 |
| 6,738,502 | B1 | * | 5/2004 | Coleman et al. ............ 382/133 |
| 6,785,410 | B1 | * | 8/2004 | Vining et al. ................ 382/128 |

FOREIGN PATENT DOCUMENTS

| | | |
|---|---|---|
| EP | 0 627 892 A1 | 7/1994 |
| EP | 0 717 346 A2 | 6/1996 |
| WO | WO 92/11602 | 7/1992 |
| WO | WO 99/11602 | 3/1999 |
| WO | WO99/27495 | 6/1999 |
| WO | WO 99/27495 | 6/1999 |

OTHER PUBLICATIONS

U.S. Appl. No. 09/410,367—Jeffrey Saffer et al.—filed Sep. 30, 1999.

Bertin, Jacques, *Semiology of Graphics*, University of Wisconsin Press, 1983.

Ahlberg et al., "IVEE: An Information Visualization & Exploration Environment", *IEEE, ISBN 0-8186-7201-3*, pp. 66-73 (1995).

Altschul et al., "Basic Local Alignment Search Tool," *Journal of Molecular Biology*, vol. 215, pp. 403-410 (1990).

International Search Report re: PCT/US00/26964 mailed Aug. 12, 2002.

Mohamed, Magdi et al., "Handwritten Word Recognition Using Segmentation-Free Hidden Markov Modeling and Segmentation-Based Dynamic Programming Techniques," *IEEE Pattern Analysis and Machine Intelligence*, vol. 18, pp. 1-15 (May 1996).

Roberts, Jonathan C., "On Encouraging Multiple Views for Visualization," *Proceedings, 1998 IEEE Conference on Information Visualization, An International Conference on Computer Visualization and Graphics*, pp. 8-14 (Jul. 29-31, 1998).

Ahlberg et al., "IVEE: An Information Visualization & Exploration Environment", *IEEE, ISBN 0-8186-7201-3*, pp. 66-73 (1995).

Altschul et al., "Basic Local Alignment Search Tool." *Journal of Molecular Biology*, vol. 215, pp. 403-410 (1990).

Mohamed, Magdi et al., "Handwritten Word Recognition Using Segmentation-Free Hidden Markov Modeling and Segmentation-Based Dynamic Programming Techniques," *IEEE Pattern Analysis and machine Intelligence*, vol. 18, pp. 1-15 (May 1996).

Roberts, Jonathan C., "On Encouraging Multiple Views for Visualization," *Proceedings, 1998 IEEE Conference on Information Visualization, An International Conference on Computer Visualization and Graphics*, pp. 8-14 (Jul. 29-31, 1998).

* cited by examiner

METHODS AND APPARATUS FOR DISPLAYING DISPARATE TYPES OF INFORMATION USING AN INTERACTIVE SURFACE MAP

RELATED APPLICATIONS

The following identified U.S. patent applications are relied upon in this application:

U.S. patent application Ser. No. 09/409,260, entitled "METHODS AND APPARATUS FOR EXTRACTING ATTRIBUTES OF GENETIC MATERIAL," filed on the same date herewith by Jeffrey Saffer, et al.;

U.S. patent application Ser. No. 08/713,313, entitled "SYSTEM FOR INFORMATION DISCOVERY," filed on Sep. 13, 1996; and U.S. patent application Ser. No. 09/410,367, entitled "DATA PROCESSING, ANALYSIS, AND VISUALIZATION SYSTEM FOR USE WITH DISPARATE DATA TYPES," filed on the date herewith by Jeffery Saffer, et al.

The disclosures of each of these applications are herein incorporated by reference in their entirety.

BACKGROUND OF THE INVENTION

A. Field of the Invention

This invention relates generally to methods and apparatus for displaying information graphically.

B. Description of the Related Art

A problem today for many practitioners, particularly in the science disciplines, is the scarcity of available time to review the large volumes of information that are being collected. For example, modern methods in the life and chemical sciences are producing data at an unprecedented pace. This data may include not only text information, but also DNA sequences, protein sequences, numerical data (e.g., from gene chip assays), and categoric data.

Given this flood of diverse information, effective and timely use of the results is no longer possible using traditional approaches, such as lists, tables, or even simple graphs. Furthermore, it is clear that more valuable hypotheses can be derived by simultaneous consideration of multiple types of experimental data (e.g., protein sequence in addition to gene expression data), a process that is currently problematic with large amounts of data.

Others have developed graphical depictions of multivariate data. See e.g., Nielson G M, Hagen H, Müller H, eds., (1997) *Scientific Visualization*, IEEE Computer Society, Los Alamitos; Becker R A, Cleveland W S (1987) *Brushing Scatterplots*, Technometrics 29:127–142; Cleveland W S (1993) *Visualizing Data*, Hobart Press, Summit, N J; Bertin J (1983) *Seminology of Graphics*, University of Wisconsin Press, London; Cleveland W S (1993) Visualizing Data, Hobart Press, Summit, N J. Although these efforts may provide a graphical description of data, they do not provide an integrated, interactive, and intuitive approach that allows a user to explore information to discover knowledge.

There exists, therefore, a need for methods and apparatus that address the shortcomings of these graphical interfaces.

SUMMARY OF THE INVENTION

Methods and apparatus consistent with the present invention, as embodied and broadly described herein, use interactive surface maps to display disparate types of information graphically. These methods and apparatus provide a graphical depiction of records and their attributes in a manner that is easy for the human mind to assimilate, highlights the most informative features of the data, and enables unexpected relationships to be found.

Consistent with the invention, a method of interactively displaying records and their associated attributes involves defining a set of graphic images, wherein each graphic image represents a range of values. The method generates a surface map, with records arranged along a first dimension and graphic images (representing attributes associated with the records) arranged along a second dimension. Upon receiving input from a user selecting a record on the surface map, an index is analyzed to determine if the record is shown in another view. If the record is shown in another view, the visual representation of the record in the other view is altered.

Consistent with the invention, a computer-readable medium includes instructions for controlling a computer system to perform a method for interactively displaying records and their associated attributes. The method involves selecting a set of records and their associated attributes, wherein the associated attributes are any combination of numeric, categoric, sequence, and text information. The method converts the attributes into numeric values, and defines a set of graphic images, wherein each graphic image represents a range of numeric values. The method generates a surface map with the set of records arranged along a first dimension and graphic images (representing attributes associated with the records) arranged along a second dimension.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

FIG. 4b is an exploded view of a portion of FIG. 4a;

DETAILED DESCRIPTION

Reference will now be made in detail to an embodiment of the present invention as illustrated in the accompanying drawings. The same reference numbers may be used throughout the drawings and the following description to refer to the same or like parts.

A. Overview

Methods and apparatus consistent with the invention provide tools that allow a user to display information interactively so that the user can explore the information to discover knowledge. One such tool displays a set of records and their associated attributes in the form of a detailed, resizeable, scrollable two-dimensional surface map. As used herein, the term "record" (or "object") generally refers to an individual element of a data set. The characteristics associated with records are generally referred to herein as attributes.

The tool also generates reduced-size two- and three-dimensional surface maps that provide an overview of the information displayed in the detailed surface map. Each of these maps are linked to other views, such that a record selected in one map is highlighted in the other views, and vice versa.

B. Architecture

Figure 1:
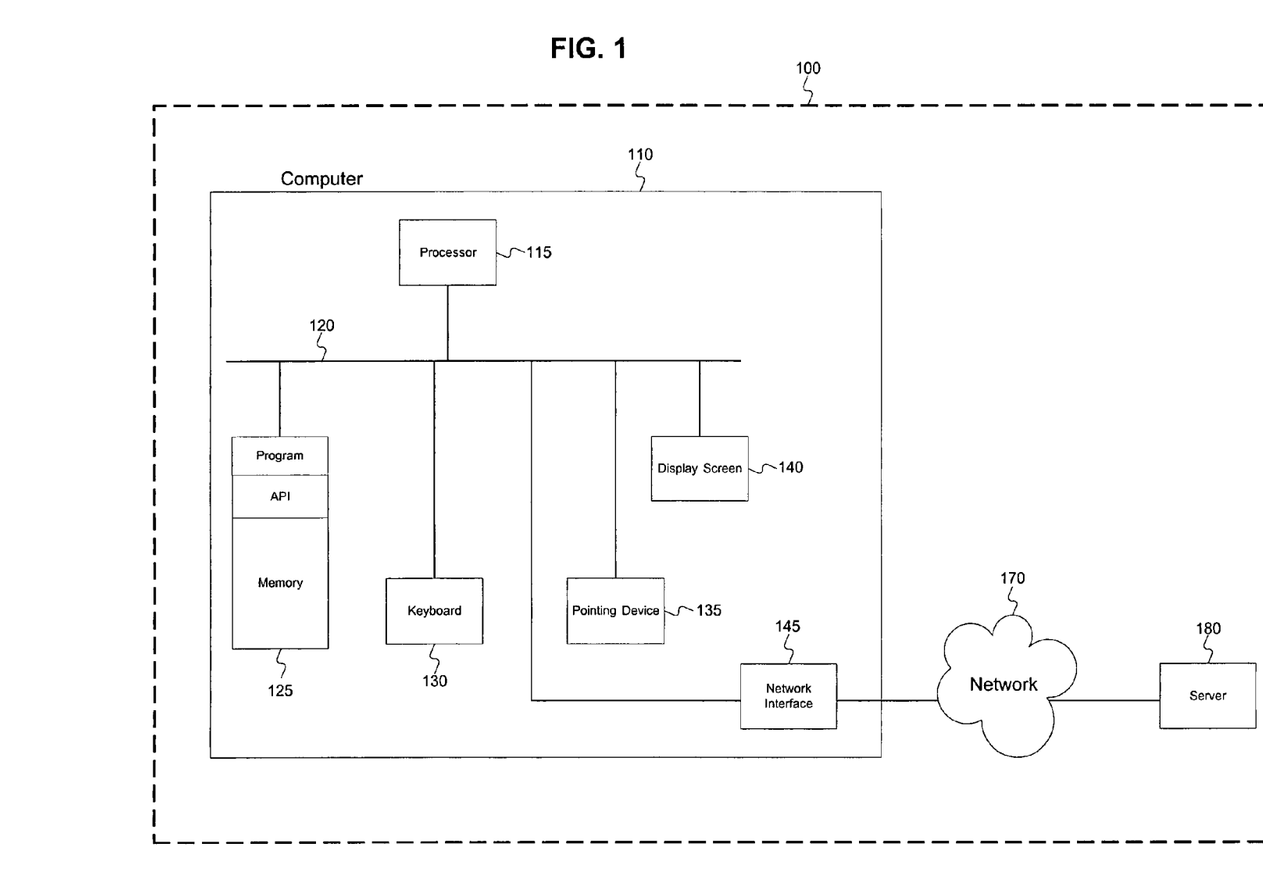
FIG. 1 is a block diagram of a system in which methods and apparatus consistent with the present invention map be implemented.

FIG. 1 is a block diagram of a computer system 100 in which methods and apparatus consistent with the invention can be implemented. System 100 comprises a computer 110 connected to a server 180 via a network 170. Network 170 can be, for example, a local area network (LAN), a wide area network (WAN), or the Internet. System 100 is suitable for use with the Java™ programming language, although one skilled in the art will recognize that methods and apparatus consistent with the invention can be applied to other suitable user environments.

Computer 110 comprises several components that are all interconnected via a system bus 120. Bus 120 can be, for example, a bi-directional system bus that connects the components of computer 110, and contains thirty-two address lines for addressing a memory 125 and a thirty-two bit data bus for transferring data among the components. Alternatively, multiplex data/address lines can be used instead of separate data and address lines. Computer 110 communicates with other users' computers on network 170 via a network interface 145, examples of which include Ethernet or dial-up telephone connections.

Computer 110 contains a processor 115 connected to a memory 125. Processor 115 can be a microprocessor manufactured by Motorola, such as the 680X0 processor, a processor manufactured by Intel, such as the 80X86 or Pentium processors, or a SPARC™ microprocessor from Sun Microsystems, Inc. However, any other suitable microprocessor or micro-, mini-, or mainframe computer, can be used. Memory 125 can include a RAM, a ROM, a video memory, or mass storage. The mass storage can include both fixed and removable media (e.g., magnetic, optical, or magnetic optical storage systems or other available mass storage technology). Memory 125 can include a program, an application programming interface (API), and a virtual machine (VM) that contains instructions for handling constraints, consistent with the invention.

A user typically provides information to computer 110 via a keyboard 130 and a pointing device 135, although other input devices can be used. In return, information is conveyed to the user via display screen 140.

C. Architectural Operation

Before information may be displayed interactively so that a user can explore and discover knowledge, it must be processed into a condition suitable for display. Although this processing is described in detail in U.S. patent application Ser. No. 09/410,367, entitled "DATA PROCESSING, ANALYSIS, AND VISUALIZATION SYSTEM FOR USE WITH DISPARATE DATA TYPES," it may be described briefly as follows. First, the information represented by the records (including text, numeric, categoric, and sequence/string data) is received in electronic form. Second, the records are analyzed to produce high-dimensional vectors, which are indexed. Third, the high-dimensional vectors are grouped in space to identify relationships. Fourth, the high-dimensional vectors are converted to a two dimensional representation for viewing purposes, generally referred to herein as "projection." Fifth, the projections may be viewed in different formats according to user-selected options. Each view is linked to an index (or indices), such that a user selection in one view propagates to other views.

Figure 2:
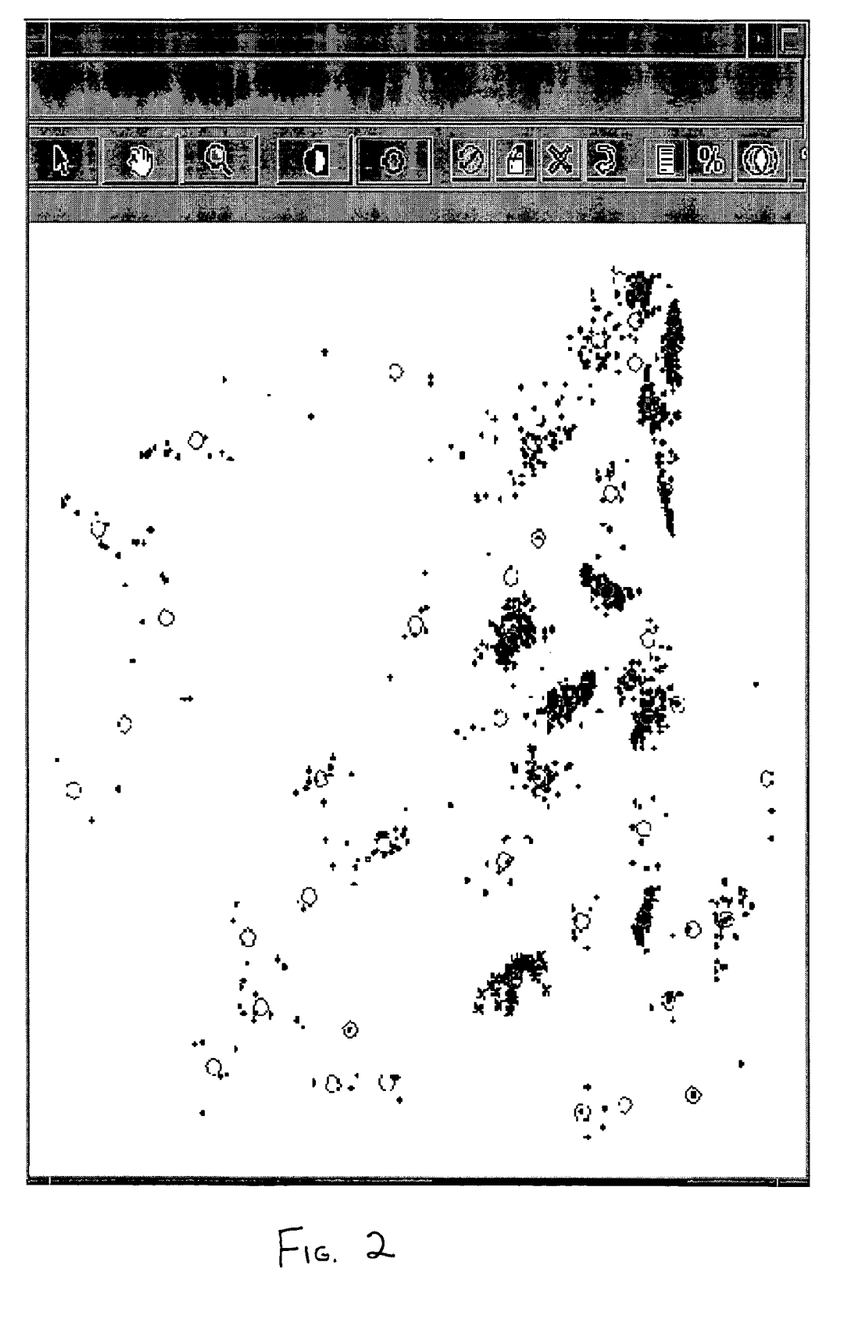
FIG. 2 is a representative user interface screen showing a galaxy view consistent with the invention.

One basic visual tool consistent with the invention for viewing information is a "galaxy view," an example of which is shown in FIG. 2. The galaxy view is a two-dimensional scatter graph in which records are organized and depicted in groups (or "clusters") based on relationships between one record and another. In addition to this galaxy view tool, the invention provides numerous interactive visual tools that allow a user to explore and discover knowledge.

Figure 3:
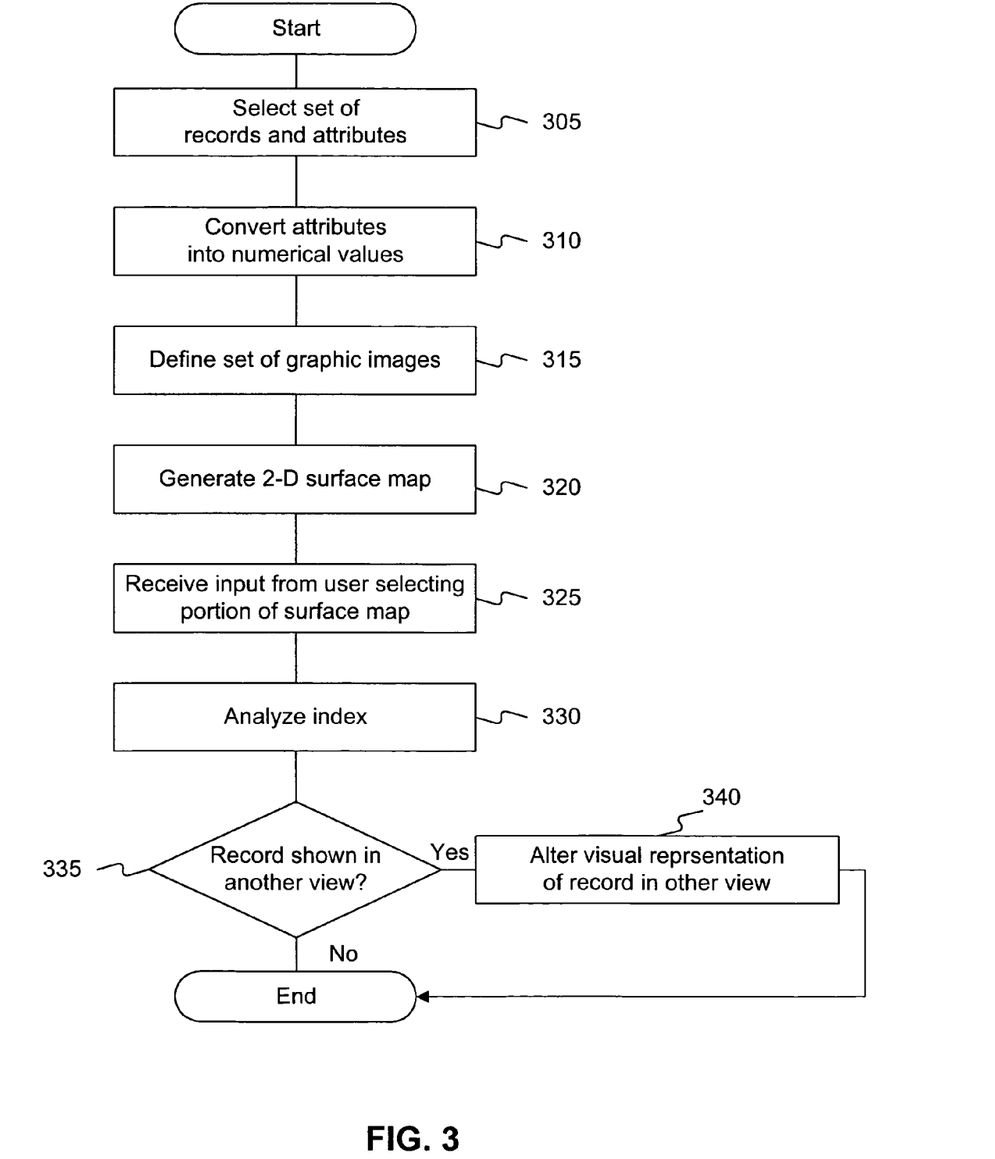
FIG. 3 a flow diagram of a method consistent with the invention for displaying information interactively by using a surface map.

FIG. 3 describes one method of displaying information interactively, in the form of a two-dimensional surface map. The method begins with the user selecting a set of records and a set of attributes associated with those records (step 305). The attributes may comprise any of numerous data types, including the following: numeric, text, sequence (e.g., protein or DNA sequences), or categoric. The selected attributes are converted into numerical values, as explained in U.S. patent application Ser. No. 09/410,367, entitled "DATA PROCESSING, ANALYSIS, AND VISUALIZATION SYSTEM FOR USE WITH DISPARATE DATA TYPES" (step 310). A set of graphic images are defined, wherein each graphic image represents a range of values (step 315). At one extreme, this range of values may consist of a single value. In one implementation, gray-scale or color rectangular blocks are used as graphic images, with each shade or color representing a distinct range of values. The user may select from a list of predefined color schemes or may independently define a color scheme and its associated range of values.

Figure 4A:
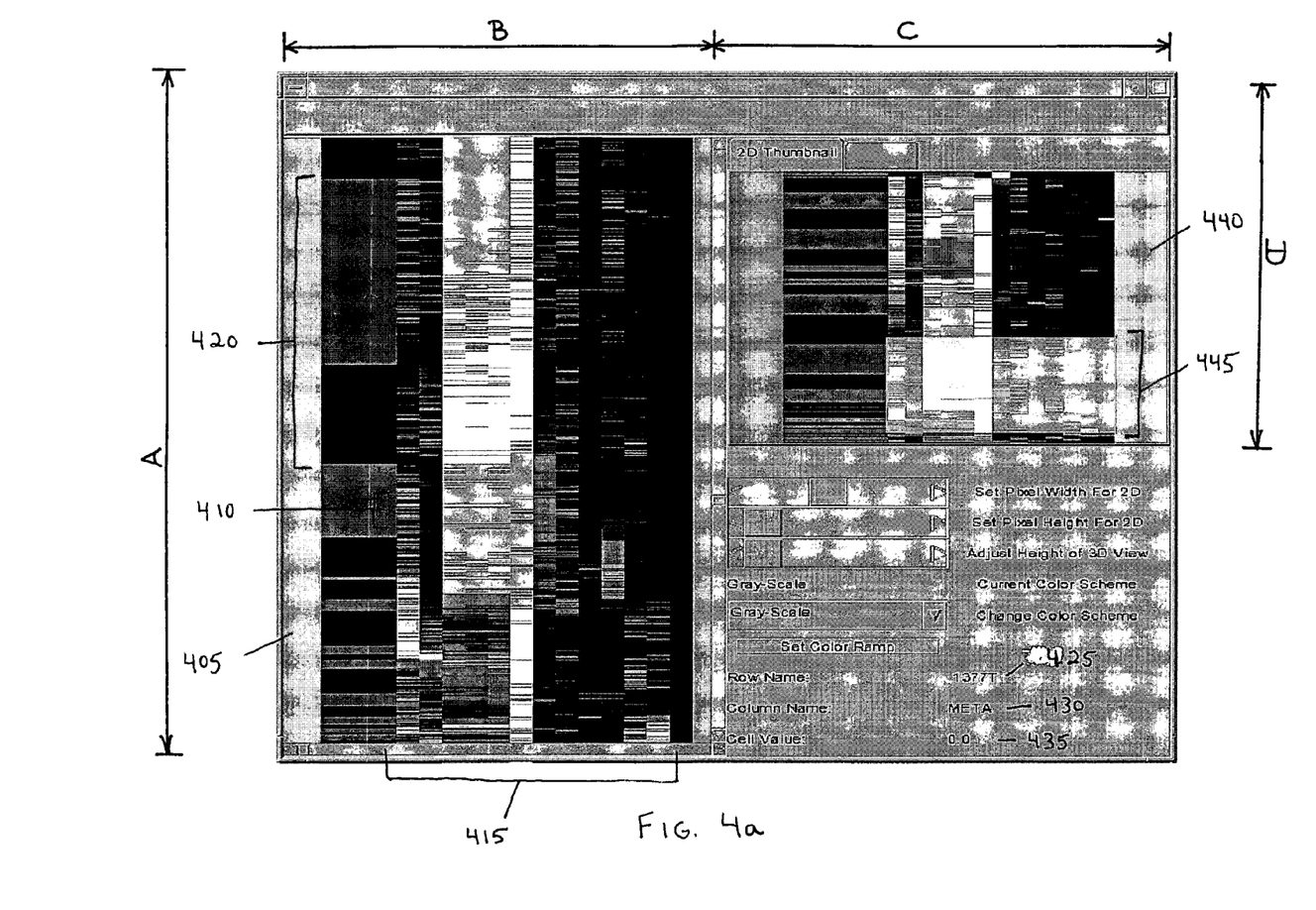
FIG. 4a is a representative user interface screen showing a surface map consistent with the invention.

Next, a two-dimensional surface map is generated to visually depict the records and their associated attributes (step 320). FIG. 4a illustrates one implementation of a resizeable, scrollable surface map 405 (the portion of FIG. 4a bounded by "A" and "B") that is arranged as an array, with records forming the rows and attributes forming the columns. Each row within 405, a set of which are shown as 410, depicts information associated with a record. Within each row, a series of gray-scale rectangular blocks are used to depict the value of each attribute associated with that record, as shown in 415.

Figure 4B:
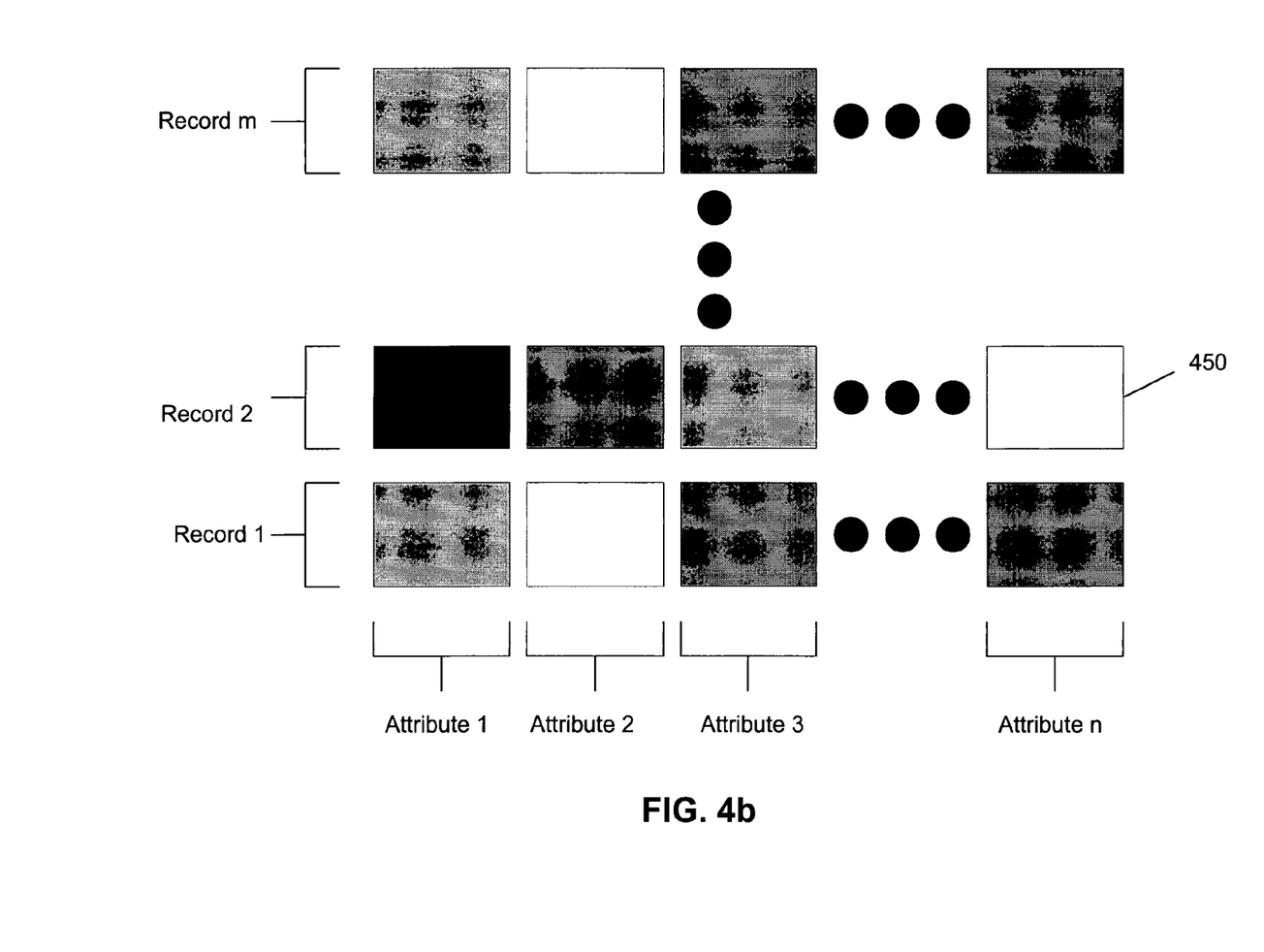

FIG. 4b is an exploded view of a portion of surface map 405, such as the portion identified as 410 in FIG. 4a. As shown in FIG. 4b, each record is represented by a series of graphic images (such as graphic image 450), that collectively form a row. Each graphic image 450 represents the numeric value of an attribute associated with a record. In short, each "row" of the surface map represents a record, and each "column" represents the value of a particular attribute for each record.

The ordering of records within map 405 may be defined by the user; or it may be achieved by using algorithms, such as statistical correlation. Similarly, the ordering of the attributes associated with each record may be defined by the user or by an algorithm. Furthermore, relationships between records may be depicted within map 405 in numerous ways. For example, graphical bands (e.g., the two bands shown as 420), may be used to represent related groups of records. Alternatively, conventional dendograms may be used to show relationships between records.

In one implementation, the ordering of records is performed by grouping the records into clusters that have centroids. These clusters are then ordered based on a correlation algorithm applied to the centroids. Finally, within each cluster, the records are ordered by sorting based on the mean distance between each record and the centroids neighboring that record's centroid—the goal being to place each record closest to the neighboring centroid to which it is the most similar. For the terminal clusters, where there is only a single neighboring centroid, the records are sorted by mean distance from the single centroid neighbor. This approach minimizes distances between like records, provides a smooth blending from one record to the next, and allows the user to see structure in the data that would otherwise be difficult to find.

FIG. 4a also shows a reduced-size, two-dimensional surface map 440 (the portion by "C" and "D") that depicts all records and attributes that are being evaluated. The portion of map 440 that is currently being viewed in enlarged size (i.e., portion 405), is highlighted in 440, as shown by 445. As a result, the reduced-size map 440 provides an overview of the information and allows the user to quickly determine which portion of the information is being shown by map 405.

Figure 5:
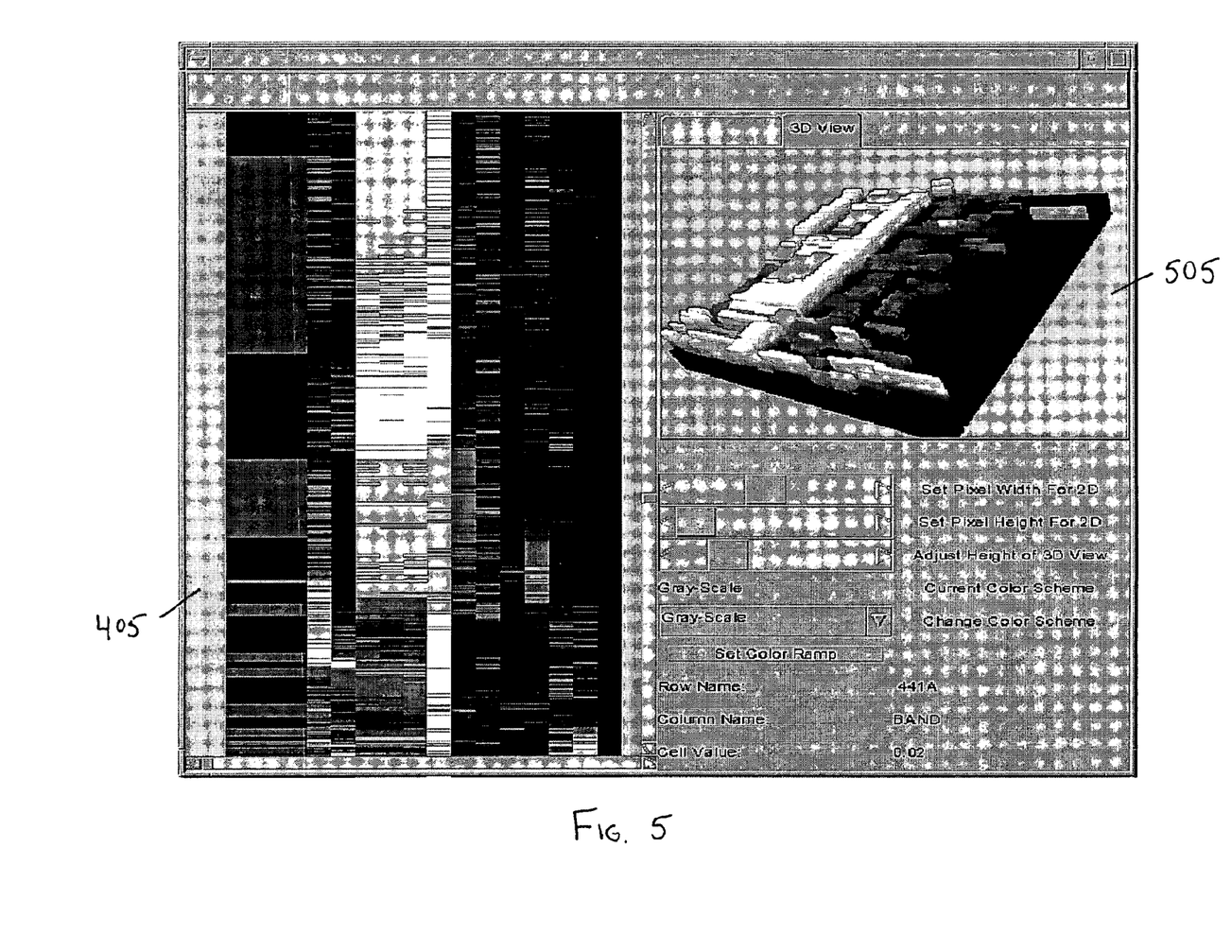
FIG. 5 is another representative user interface screen showing a surface map consistent with the invention.

In addition to map 440 shown in FIG. 4a, a three-dimensional surface map 505 may be used, as shown in FIG. 5. In the implementation shown, records are arranged in rows from the bottom-left to the upper-left; attributes are arranged as columns of gray-scale rectangular blocks from the bottom-left to the bottom-right; and values corresponding to each particular attribute for each particular record are represented both by the shade of gray and the height of each rectangular block. Map 505 may contain either the records shown in 405 or all records being evaluated, and may be rotated in any of the three dimensions and/or zoomed to view the information contained therein.

In addition to viewing the information in graphical form, the user can interact with the surface maps. Systems consistent with the invention are capable of receiving input from a user selecting a portion of the surface map (step 325). This may be achieved, for example, by using a device to point to a portion of map 405 or by clicking a pointing device on a portion of map 405. In response to this user input, the information associated with the identified portion can be displayed in text format. For example, the record being pointed to in FIG. 4a is identified as "1377T", as shown by 425. Similarly, the attribute being pointed to in FIG. 4a is identified as "META", as shown by 430. The value of the attribute being pointed to in FIG. 4a is identified as "0.0", as shown by 435.

Figure 6:
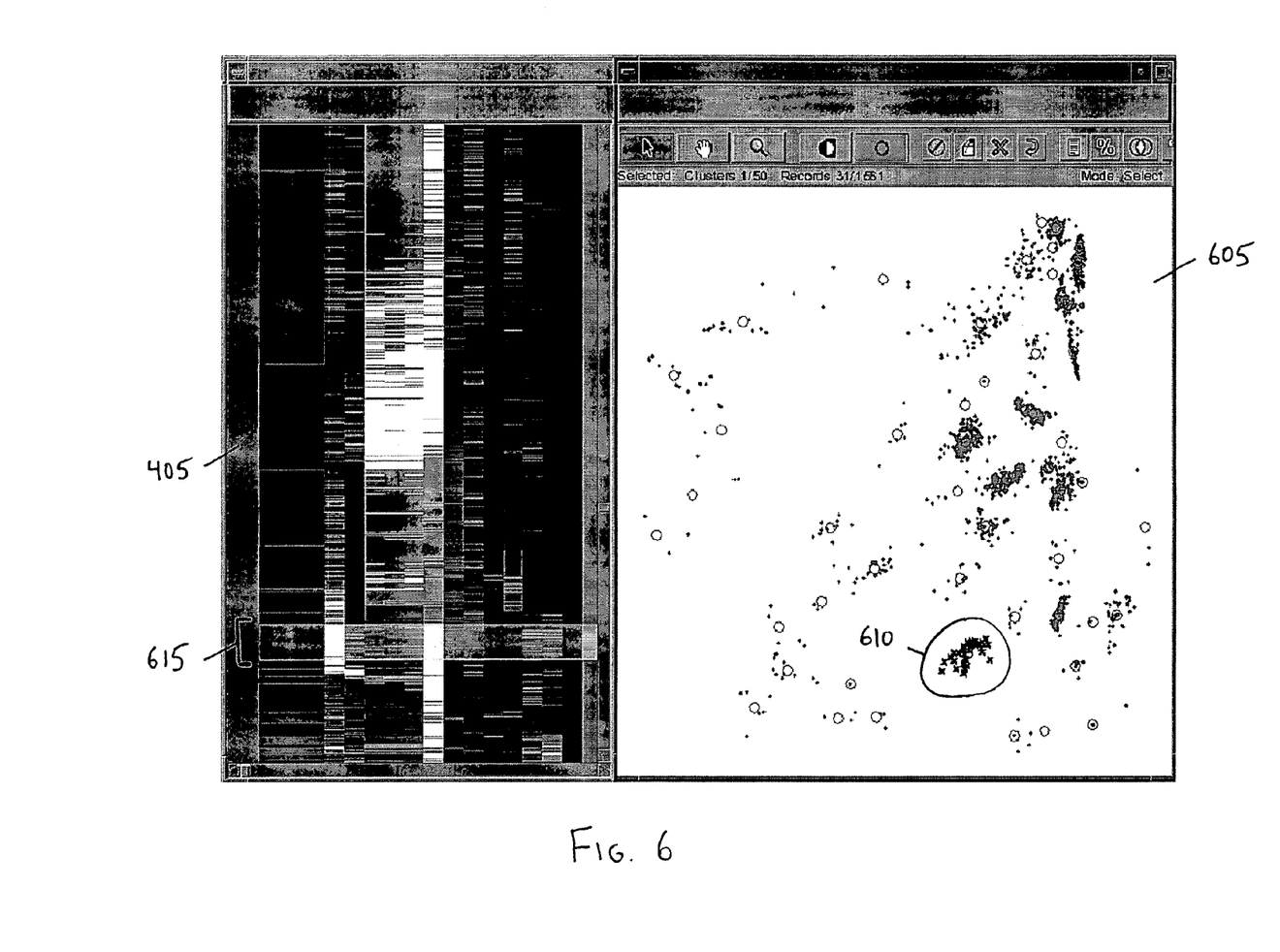
FIG. 6 is another representative user interface screen showing a surface map and a galaxy view consistent with the invention.

Furthermore, any selections made by the user on a surface map are propagated to other views. For example, in response to receiving input from a user selecting a record in surface map 405, an index is analyzed to determine if the record is shown in another view (step 330). This index is described more fully above in U.S. patent application Ser. No, 09/410.367, entitled "DATA PROCESSING, ANALYSIS, AND VISUALIZATION SYSTEM FOR USE WITH DISPARATE DATA TYPES." If the record is shown in another display (step 335), the visual representation of that record in the other view is altered (step 340). FIG. 6 is a diagram showing both map 405 and a galaxy view of records 605. If a record is selected on map 405, the record is highlighted In galaxy view 605, and vice versa. Similarly, selecting a group of records on map 405 (as shown by 610) causes the corresponding group of records to be highlighted in galaxy view 605 (as shown by 615), and vice versa.

D. CONCLUSION

As described in detail above, methods and apparatus consistent with the invention provide tools that allow a user to display information interactively so that the user can explore the information to discover knowledge. The foregoing description of an implementation of the invention has been presented for purposes of illustration and description. Modifications and variations are possible in light of the above teachings or may be acquired from practicing the invention.

For example, although the foregoing description focuses on data types such as text, numeric, categoric, and sequence, those skilled in the art will recognize that other data types may be used consistent with the invention. Furthermore, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method of interactively displaying a set of records and their associated attributes, comprising:
    defining a set of graphic images, wherein each graphic image represents a range of values;
    generating a first visual representation, the first visual representation being a surface map of the set of records with (1) graphic images, representing values for a plurality of attributes associated with each record in the set, the attributes being arranged along a first dimension, and (2) the records, represented by a collection of graphic images, arranged along a second dimension;
    generating a second visual representation of a plurality of the records in the set;
    displaying the first surface map and second visual representations such that they appear on a display simultaneously;
    receiving input from a user selecting a subset of the records from the first surface map; and
    altering the second visual representation to highlight the selected subset simultaneously with displaying the first visual representation, wherein the graphic images are color-coded blocks.

2. The method of claim 1, wherein the second visual representation is a galaxy view.

3. The method of claim 1, wherein the records are ordered into groups.

4. The method of claim 1, wherein the order of display of the attributes associated with the records is based on statistical correlation.

5. The method of claim 1, wherein the order of display of the attributes associated with the records is based on cluster analysis.

6. The method of claim 1, further comprising analyzing an index to determine if one or more of the records in the selected subset is shown in the second visual representation.

7. The method of claim 1, further comprising generating a dendogram to indicate relationships between records.

8. The method of claim 1, further comprising:
determining a text-based identification of the record represented in the selected portion of the first surface map; and
displaying the text-based identification.

9. The method of claim 3, wherein the groups are ordered based on statistical correlation.

10. A computer-implemented method of interactively displaying records and their corresponding attributes, comprising:
providing a surface map of the set of records with (1) graphic images, representing values for a plurality of attributes associated with each record in the set, the attributes being arranged along a first dimension, and (2) the records, represented by a collection of graphic images, arranged along a second dimension, said surface map representing a set of records;
providing a set of views for simultaneous display;
linking the surface map to the set of views, wherein at least one of the views comprises a visual representation of a plurality of the records in the set;
receiving an input signal selecting a portion of the surface map; and
indicating, in a view linked to the surface map, a plurality of the records corresponding to the selected portion simultaneously with the displaying the set of views,
wherein the graphic images are color-coded blocks.

11. A method of interactively displaying a set of records and their corresponding attributes, comprising:
defining a set of graphic images, wherein each graphic image represents a range of values and the graphic images are color-coded blocks;
generating a first visual representation, the first visual representation being a three-dimensional surface map with (1) each record in the set arranged along a first dimension, (2) graphic images, representing values for a plurality of attributes associated with the records, the attributes being arranged along a second dimension, and (3) the values associated with the attributes arranged along a third dimension;
generating a second visual representation of a plurality of the records in the set;
displaying simultaneously the surface map and the second visual representation;
receiving input from a user selecting a subset of the records on the surface map;
analyzing an index to determine if the selected subset is shown in the second visual representation; and
altering the second visual representation based on the input, when the selected subset is shown in the second visual representation simultaneously with displaying the surface map.

12. The method of claim 11, wherein the three-dimensional surface map may be rotated in any of the three dimensions.

13. An apparatus for interactively displaying a set of records and their associated attributes, comprising:
at least one memory having program instructions; and
at least one processor configured to execute the program instructions to perform the operations of:
defining a set of graphic images, wherein each graphic image represents a range of values;
generating a first visual representation, the first visual representation being a surface map with the records of the set arranged along a first dimension and graphic images, representing values for a plurality of attributes associated with the records, the attributes being arranged along a second dimension;
generating a second visual representation of a plurality of the records in the set;
displaying simultaneously the surface map and the second visual representation;
receiving input from a user selecting a subset of the records from the first surface map; and
analyzing an index to determine if one or more records in the selected subset are shown in another view; and
altering the second visual representation based on the input, when one or more records in the selected subset are shown in another view while simultaneously displaying the surface map and the second visual representation, wherein the graphic images are color-coded blocks.

14. An apparatus for interactively displaying a set of records and their associated attributes, comprising:
means for defining a set of graphic images, wherein each graphic image represents a range of values;
means for generating a first visual representation, the first visual representation being a surface map with the records of the set arranged along a first dimension and graphic images, representing values for a plurality of attributes associated with the records, the attributes being arranged along a second dimension;
means for generating a second visual representation of a plurality of the records from the set;
means for simultaneously displaying the surface map and the second visual representation;
means for receiving input from a user selecting a subset of the records on the surface map;
means for analyzing an index to determine if one or more records in the selected subset are shown in another view; and
means for altering the second visual representation based on the input, when one or more records in the selected subset are shown in the second visual representation while simultaneously displaying the surface map and the second visual representation, wherein the graphic images are color-coded blocks.

* * * * *